United States Patent [19]

Witzeman et al.

[11] Patent Number: 5,373,048
[45] Date of Patent: Dec. 13, 1994

[54] AQUEOUS COATING COMPOSITION

[75] Inventors: J. Stewart Witzeman, Den Haag, Netherlands; Q. Leslie Scott; Paul J. Greene, both of Kingsport, Tenn.; Kevin A. Williams; Stephen L. Poteat, both of Gray, Tenn.

[73] Assignee: Eastman Chemical Company, Kingsport, Tenn.

[21] Appl. No.: 99,500

[22] Filed: Jul. 30, 1993

[51] Int. Cl.$^5$ .................. C08F 2/30; C08F 255/00; C08K 5/17
[52] U.S. Cl. .................. 524/458; 524/460; 524/556; 524/599
[58] Field of Search .................. 525/379, 380, 382; 524/458, 460, 556, 599

[56] References Cited

U.S. PATENT DOCUMENTS

| | | | |
|---|---|---|---|
| 3,579,485 | 5/1971 | Folzenlogen et al. | 525/285 |
| 3,644,258 | 2/1972 | Moore et al. | 524/162 |
| 3,919,176 | 11/1975 | Meyer, Jr. et al. | 525/285 |
| 4,070,421 | 1/1978 | Etter, Jr. | |
| 4,567,223 | 1/1986 | Ames | 524/489 |
| 4,613,679 | 9/1986 | Mainord | 526/324 |
| 4,954,573 | 9/1990 | Fry et al. | 525/327.6 |
| 4,962,149 | 10/1990 | Fry et al. | 524/555 |
| 4,966,947 | 10/1990 | Fry et al. | 525/327.6 |

OTHER PUBLICATIONS

WO 90/12656 published Nov. 1, 1990—PCT—Laura et al.

Primary Examiner—James J. Seidleck
Assistant Examiner—M. L. Warzel
Attorney, Agent, or Firm—Charles R. Martin

[57] ABSTRACT

Disclosed is a composition comprising
(A) a polymer selected from the group consisting of
 (1) an amorphous, non-chlorinated, maleated polypropylene,
 (2) an amorphous, non-chlorinated, maleated propylene-ethylene copolymer,
 (3) an amorphous, non-chlorinated, maleated propylene-hexene copolymer,
 (4) an amorphous, non-chlorinated, maleated propylene-butene copolymer,
 (5) an amorphous, non-chlorinated, maleated propylene-ethylene-butene terpolymer, and
 (6) an amorphous, non-chlorinated, maleated propylene-ethylene-hexene terpolymer,
(B) a nonionic surfactant,
(C) a primary, secondary or tertiary amine, and
(D) water.

7 Claims, No Drawings

AQUEOUS COATING COMPOSITION

This invention relates to aqueous compositions useful as primers useful for enhancing the adhesion of coatings to polyolefin substrates.

The application of paints and other coatings to substrates of polyolefin, such as polypropylene, thermoplastic olefin and polyethylene, is typically difficult because polyolefins are substantially chemically inert.

This problem has previously been overcome by use of two different approaches which employ adhesion promoting compositions. One approach is to use an adhesion promoting composition as a separate primer coating between the polyolefin substrate and the paint. The primer coating adheres adequately to both the polyolefin and the paint and thereby creates a unitary three component structure with the paint as the outer portion of the structure. Another approach to coating polyolefins has been to use an adhesion promoting composition as an additive along with the paint. This technique is sometimes known in the art as use of a "stir in" adhesion promoter.

Numerous polymeric materials have been investigated as possible components for such adhesion promoters. Chlorinated polyolefins have been found to be very satisfactory as the polymeric component for primer compositions due to their cost and performance. For example, U.S. Pat. Nos. 3,579,485, 4,070,421, 4,966,947, 4,962,149 and 4,954,573 disclose chlorinated polyolefins which are entirely satisfactory for the polymeric component of adhesion promoting compositions useful for coating polyolefin substrates.

Even though chlorinated polyolefins have been used to prepare adhesion promoting compositions which are entirely satisfactory, historically the chlorinated polyolefins had to be formulated with an organic solvent, such as xylene or toluene. Use of an organic solvent was undesirable because unless elaborate solvent recovery methods are employed application of the primer coating composition results in release of the organic solvent into the atmosphere which can result in both pollution problems and health problems for workers applying the primer coating composition.

One approach to overcoming the problems associated with the use of organic solvents in primer coating compositions has been to replace the vast majority of the organic solvent. For example, a chlorinated polyolefin containing primer coating composition which is substantially free of organic solvents is disclosed in WO90/12656.

We have now discovered an entirely satisfactory water based adhesion promoting composition wherein the polyolefin does not contain chlorine.

Broadly, the composition of this invention can be thought of as a four component composition comprising
(A) a non-chlorinated, maleated polyolefin,
(B) a nonionic surfactant,
(C) a primary, secondary or tertiary amine, and
(D) water.

The polyolefins useful in this invention are can be broadly described as selected from one of the following groups.

(1) An amorphous, non-chlorinated, maleated polypropylene having an acid number in the range of 15 to 65, preferably 30 to 50, and a molecular weight of at least 800.

(2) An amorphous, non-chlorinated, maleated propylene-ethylene copolymer having propylene units in the range of 60 to 98 mole percent, preferably 80 to 95 mole percent, ethylene units in the range of 40 to 2 mole percent, preferably 20 to 5 mole percent, an acid number in the range of 15 to 65, preferably 30 to 50 and a molecular weight of at least 800.

(3) An amorphous, non-chlorinated, maleated propylene-hexene copolymer having propylene units in the range of 30 to 98 mole percent, preferably 35 to 95 mole percent, hexene units in the range of 70 to 2 mole percent, preferably 65 to 5 mole percent, an acid number in the range of 20 to 65, preferably 25 to 65 and a molecular weight of at least 800.

(4) An amorphous, non-chlorinated, maleated propylene-butene copolymer having propylene units in the range of 40 to 98 mole percent, preferably 45 to 90 mole percent, butene units in the range of 60 to 2 mole percent, preferably 55 to 10, an acid number in the range of 15 to 50, preferably 20 to 45 and a molecular weight of at least 800.

(5) An amorphous, non-chlorinated, maleated propylene-ethylene-butene terpolymer having propylene units in the range of 40 to 80 mole percent, preferably 50 to 80 mole percent, ethylene units in the range of 1 to 20 mole percent, butene units in the range of 30 to 60 mole percent, preferably 15 to 49 mole percent, an acid number in the range of 15 to 50, preferably 20 to 45 and a molecular weight of at least 800.

(6) An amorphous, non-chlorinated, maleated propylene-ethylene-hexene terpolymer having propylene units in the range of 40 to 80 mole percent, ethylene units in the range of 1 to 20 mole percent, hexene units in the range of 20 to 60 mole percent, an acid number in the range of 15 to 50 and a molecular weight of at least 800.

The polyolefins useful in this invention have been reacted with maleic anhydride according to techniques well known in the art and therefore have acid numbers which are described above. For example, the polyolefins and methods for their preparation are disclosed in U.S. Pat. No. 4,567,223. The acid numbers of the polyolefins are determined by ASTM D 1386.

All of the polymers useful in this invention and methods for their preparation are well known in the art.

In this invention the molecular weight of the polyolefin is average number molecular weight.

The total amount of polyolefin in the composition is not significant as long as the relative amounts of components (B) and (C) are within the ranges for these materials.

The surfactant useful in this invention can be broadly described as a non-ionic surfactant. By the term "non-ionic surfactant" we mean a surfactant which contains no positively or negatively charged functional groups.

In this invention the surfactants can have a molecular weight of up to 500 or even higher and can include polymeric materials. The surfactants include materials which contain groups of varying polarity whereby one part of the molecule is hydrophilic and the other part of the molecule is hydrophobic. Examples of such materials include polyethyleneoxy polyols and ethoxylated alkyl phenols. Particularly preferred classes of surfactants include alkyl phenoxy poly(ethyleneoxy) alcohols, primary ethoxylated alcohols and secondary ethoxylated alcohols. Preferably the surfactant is a primary ethoxylated alcohol having 12 to 15 carbon atoms or a secondary ethoxylated alcohol having 11 to 15 carbon atoms. Examples of alkyl phenoxy poly(ethyleneoxy) alcohols include Igepal CO-710 and Igepal CO-730 sold by Rhone Poulenc. Examples of primary ethoxylated alcohols include Neodol 25-9 and Neodol 25-12 sold by Shell Chemical Company. Examples of secondary ethoxylated alcohols include Tergitol 15-S-9 and Tergitol 15-S-15 sold by Union Carbide Company.

The amount of surfactant is broadly in the range of 18 to 50 weight percent and is preferably in the range of 20 to 25 weight percent, based on the weight of the polyolefin.

The amine component which is used in the composition of this invention can be a primary, secondary or tertiary amine. Although the amine can be aromatic or aliphatic, aliphatic amines are preferred. In a preferred embodiment the aliphatic amine has an amine functionality of between 1 and 3, and optionally contains other oxygen containing functional groups. The amines useful in this invention generally have a molecular weight of less than 100.

A highly preferred group of amines are primary, secondary and tertiary aliphatic amines having a functionality of 1 to 3 and can be generally represented by the general formulae:

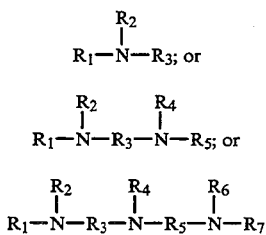

wherein $R_1=R_7$ are independently selected from H or straight or branched chain alkyl, hydroxyalkyl, or alkoxylalkyl groups of about 1 to about 20 carbon atoms; $R_1$-$R_7$ can additionally include a substituted alkyl group, i.e., where one or more of the carbons in the radical is replaced with or has substituted thereon another functionality, e.g., an amine, ether, hydroxy or -mercapto moiety, e.g., tris-(3-aminopropyl) amine.

Another group of highly preferred amines within the above classes are those primary, secondary or tertiary aliphatic amines of the above Formulae in which $R_1$-$R_7$ is specifically substituted with or contains one or more hydroxyl (—OH) functionalities.

Another group of preferred amines can be represented by the formulae:

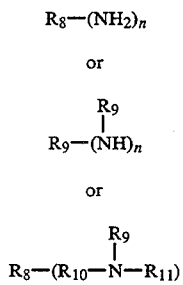

wherein n is 1 or 2 and $R_8$, $R_9$, $R_{10}$ and $R_{11}$ are independently selected from straight or branched chain alkyl, hydroxyalkyl or alkoxyalkyl groups of about 1 to about 20 carbon atoms. These chains may also be substituted with another functionality as described above.

Yet another group which comprise amines preferred in the practice of the present invention are primary, secondary and tertiary aliphatic amines with an amine functionality of about 1–3 which also contain one or more ether or alkoxy linkages. Such materials are sometimes referred to as poly(oxyalkylene)diamines. Ethoxylated or propoxylated materials are particularly preferred.

Exemplary amines preferred for use in the present invention include:
2-amino-1-butanol;
4-amino-1-butanol;
2-aminoethanethiol;
2-aminoheptane;
2-amino-1-hexanol;
6-amino-1-hexanol;
allylamine;
2-amino-3-methyl-1-butanol;
2-amino-2-methyl-1,3-propanediol;
2-amino-2-methyl-1-propanol;
2-amino-1-pentanol;
5-amino-1-pentanol;
3-amino-1-propanol;
ammonium hydroxide
amylamine;
butylamine;
N,N'-bis(2-aminoethyl)-1,3-propanediamine;
N,N'-bis(3-aminopropyl)-1,3-propanediamine;
1,3-bis(dimethylamino)-2-propanol;
1-[N,N-bis(2-hydroxyethyl)amino]-2-propanol;
N,N'-bis(2-hydroxyethyl)ethylenediamine;
decylamine;
1,4-diaminobutane;
1,10-diaminodecane;
1,12-diaminododecane;
1,7-diaminoheptane;
1,3-diamino-2-hydroxypropane;
3,3'-diamino-N-methyldipropylamine;
1,2-diamino-2-methylpropane;
1,9-diaminononane;
1,8-diaminooctane;
1,5-diaminopentane;
1,2-diaminopropane;
1,3-diaminopropane;
dibutylamine;
3-(dibutylamino)propylamine;
diethanolamine;
diethylamine;
5-diethylamino-2-pentanol;
3-(diethylamino)-1,2-propanediol;
1-diethylamino-2-propanol;
3-diethylamino-1-propanol;
3-diethylaminopropylamine;
diethylenetriamine;
N,N-diethylethanolamine;
N,N-diethylethylenediamine;
N,N-diethylmethylamine;
N,N'-diethyl-1,3-propanediamine;
diisobutylamine;
diisopropanolamine;
diisopropylamine;
2-(diisopropylamino)ethanol;
3-diisopropylamino-1,2-propanediol;
N,N-diisopropylethylamine;
1-dimethylamino-2-propanol;
2-dimethylaminoethanol 3-dimethylamino-1-propanol;
3-dimethylaminopropylamine;
1,3-dimethylbutylamine;
3,3-dimethylbutylamine;
N,N-dimethylethanolamine;
N,N-dimethylethylamine;
N,N-dimethylethylenediamine;
N,N-dimethyl-N'-ethylethylenediamine;
N,N'-dimethyl-1-,6-hexanediamine;
2,5-dimethyl-2,5-hexanediamine;
1,5-dimethylhexylamine;
2,2-dimethyl-1,3-propanediamine;
1,2-dimethylpropylamine;
dipropylamine;
dodecylamine;
ethanolamine;
3-ethoxypropylamine;
ethylamine;
2-(ethylamino)ethanol;
N-ethylbutylamine;
2-ethylbutylamine;
N-ethyldiethanolamine;
ethylenediamine;
hexamethylenediamine;
1,6-hexanediamine;
hexylamine;
isoamylamine;
isopropylamine;
N-isopropylethylenediamine;
N'-isopropyl-2-methyl-1,2-propanediamine;
N,N,N',N'-tetramethyl-1,4-butanediamine;
N,N,N',N'-tetramethyldiaminomethane;
N,N,N',N'-tetramethylethylenediamine;
N,N,N',N'-tetramethyl-1,6-hexanediamine;
N,N,N',N'-tetramethyl-1,3-propane-diamine;
N,N,2,2-tetramethyl-1,3-propanediamine;
tributylamine;
tridecyamine;
triethanolamine;
triethylamine;
triisooctylamine;
triisopropyanolamine;
trimethylamine;
methylamine;
2-(methylamino)ethanol;
N-Methylbutylamine;
1-methylbutylamine;
2-methylbutylamine;
N-methyldiethanolamine;
N-methylethylenediamine;
N-methyl-1,3-propanediamine;
morpholine
nonylamine;
octylamine;
teri-octylamine;
propylamine;
2-(propylamino)ethanol;
1-tetradecylamine; and
tris(3-aminopropyl)amine.
Mixtures of such materials may also be employed.

Preferred amines are morpholine, 2-amino-2-methyl-1-propanol, triethanolamine and ammonium hydroxide.

The amount of amine can be in the range of 4 to 30 weight percent and preferably is in the range of 8 to 10 weight percent, based on the weight of the polyolefin.

The compositions of this invention further contain water. The amount of water can vary widely depending on numerous factors, such as the needs of the manufacturer, transportation efficiencies and the needs of the particular customer. An important property of the compositions of this invention is that these compositions can be manufactured using less water than would typically be required to apply the compositions as a coating and water can be subsequently added by the customer at a later time to prepare a coating composition. This can be done by simply pouring additional water into the composition prepared by the manufacturer without having to consider in detail any particular temperature, pressure or time used to prepare the diluted composition. Thus the manufacturer can prepare a "concentrated" product which is low in water and ship the concentrated product to the customer without the necessity of incurring the additional cost of also shipping additional amount to customer. A "concentrated" product is also often desired if the adhesion promoter composition is to be used as an additive to the paint in order to prevent excessive dilution of the paint.

Even though the amount of water can vary widely and there is no upper limit on the amount of water there is a lower limit on the amount of water because there must at least be sufficient water in the composition to result in the formation of an admixture of the four components. Although the precise amount of water necessary to form the required admixture can vary, generally there must be at least 50 weight percent water in the composition, based on the weight of the total composition, in order to form an admixture with pourable viscosity characteristics.

The compositions of this invention are characterized as "comprising" the four components. By the term "comprising" we mean that the compositions can contain other materials in major amounts. For example, the compositions of this invention can contain materials typically used in the paint industry to prepare paint formulations, such as thickeners, wetting agents and flow aids, pigments, resins and solvents.

The term "comprising" also means that the compositions can contain organic solvents but preferably the compositions are substantially free of organic solvents. Thus, the compositions of this invention preferably contain less that 10 percent, more preferably less than 5 percent and most preferably less than 1 percent organic solvent. The preferably small quantity of organic solvent can be present as an impurity or can be present as an intended component of the composition.

The compositions of this invention can be used as aa adhesion promoting composition according to two different approaches. Selection of the preferred approach depends on numerous factors, such as the specific characteristics of the paint, the particular substrate to be painted, the nature and extent of the other materials to be used in the paint formulation and other factors. In accordance with one approach, the coating compositions of this invention can be used as a separate primer coat by preferably diluting the manufactured composition with water, adding any desired additives and then applying the diluted composition to a polyolefin substrate to form a coating using conventional means, such as spraying, brushing or dipping. After the composition has been applied as a coating and the coating has dried a paint is applied over the primer coating. The primer coating adheres to both the polyolefin and the paint and thereby creates a unitary three component structure with the paint as the outer portion of the structure. In accordance with the other approach, the compositions of this invention can be used as a so-called "stir-in"

paint additive. In this approach the composition is added admixed with the paint and the resulting admixture is applied to the polyolefin substrate to form a single coating which adheres to the polyolefin substrate.

The compositions of this invention can be prepared according to techniques well known in the art.

According to one method for preparation of the composition of this invention, which is sometimes referred to in the art as a "direct pressure" method, the compositions can be prepared by introducing the four components into a pressure vessel equipped for agitation and capable of safely attaining a temperature and pressure desired. After sealing, contents of the vessel are agitated at a suitable temperature and pressure for a suitable time and then cooling the composition while agitating. Although the particular conditions must be selected based on the particular equipment available, the particular component of the composition and other factors, typically the temperature will be in the range of 120° C. to 180° C. the pressure will be in the range of 15 psi to 130 psi, and the time will be in the range of 15 minutes to 60 minutes. Other temperatures, pressures and times can be used and are within the understanding of those skilled in the art. In a preferred embodiment the compositions can be prepared using a temperature of 160° C. a pressure of 75 psi, and initial agitation time of 30 minutes followed by cooling and agitating for 15 minutes to 30 minutes.

According to another method for preparation of the compositions of this invention, sometimes referred to in the art as an "indirect pressure" method, the compositions can be prepared by introducing the four components into a pressure vessel equipped for agitation and capable of safely attaining a temperature and pressure desired. After sealing, contents of the vessel are agitated at a suitable temperature and pressure for a suitable time, diluted with water that is at a temperature ranging from 85° C. to 160° C., and the cooling the components while agitating. In a preferred embodiment the compositions can be prepared by normally agitating the components at 160° C. at a pressure of 75 psi for 30 minutes followed by dilution of the composition at approximately the same temperature and pressure, and cooling with agitation for 15 minutes to 30 minutes after dilution.

The compositions of this invention are admixtures which have a particle size suitably small to make the admixtures useful in coating embodiments. Therefore, the compositions of this invention include not only what some authorizes call "emulsions" and "dispersions" but include as well as all other physical forms in which the various components can be become admixed. For example, some authorities characterize water containing admixtures wherein the particle size in the range of 0.1 to 10 microns as an "emulsions". Other authorities regard water containing admixtures wherein the particle size is greater than 10 microns as a "dispersion". While both of these types of admixtures are within the scope of this invention, the invention is not limited to these or any other kind of particular admixture and includes all possible types of admixtures regardless of physical form as long as the particle size is small enough for the admixtures to have utility in coating applications.

While the compositions of this invention are particularly useful as adhesion promoters to enhance the adhesion of paints to polyolefin substrates it is within the scope of the invention for the compositions to be used by themselves as a paint to form a final protective coating which not only protects the substrate but also is decorative as a result of the addition of pigments.

In the following examples compositions of the invention were prepared from an amorphous, non-chlorinated, maleated polyolefin, a nonionic surfactant, an amine and sufficient water to produce emulsions having 20–40 percent, based on the weight of the total composition, of the polyolefin. The compositions were prepared by one of the above described methods.

EXAMPLE 1

This example illustrates preparation of a composition of the invention using a particular non-chlorinated, maleated polyolefin, one type of nonionic surfactant and ammonium hydroxide.

40 grams of an amorphous, non-chlorinated, maleated propylene hexene comprised of 87 mole percent propylene and 13 mole percent hexene having an acid number of 40 and a molecular weight of at least 800, 8 grams of a C11–C15 secondary ethoxylated alcohol sold by Union Carbide under the name Tergitol 15-S-9, 3.5 grams ammonium hydroxide and 45 grams of water were charged to a vessel. After cooking the emulsion for 30 minutes, 67 grams of a dilution water at a temperature of at least 85° C. was pumped into the pressure vessel resulting in a composition having a solids level of approximately 32 percent. The resultant composition was diluted with sufficient additional water to result in a primer coating composition composed of 8 percent polyolefin, based on the weight of total composition. This composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F.

Storage stability tests were conducted by visual inspection in glass jars. The results of these tests are as follows:

Stability at 75° F. for 8 weeks: Slight settling
Stability at 125° F. for 4 weeks: Slight settling
Freeze/thaw stability tests were conducted in accordance with ASTM D2243 with visual inspection. Results of this test were no change after 5 cycles.

Paint adhesion tests were conducted in accordance with ASTM D 3359-83, Method A. Results of this test were as follows:

Paint adhesion on polypropylene: 95%
Paint adhesion on TPO: 100%

EXAMPLE 2

This example illustrates preparation of a composition of the invention using a different non-chlorinated, maleated polyolefin, than used in Example 1.

40 grams of an amorphous, non-chlorinated, maleated propylene-ethylene comprised of 87 mole percent propylene and 13 mole percent ethylene having an acid number of 43 and a molecular weight of at least 800, 8 grams of a C11–C15 secondary ethoxylated alcohol sold by Union Carbide under the name Tergitol 15-S-9, 4 grams ammonium hydroxide and 45 grams of water were charged to a vessel. After cooking the emulsion for 30 minutes, 67 grams of a dilution water at a temperature of at least 85° C. was pumped into the pressure vessel resulting in a composition having a solids level of approximately 32 percent. The resultant composition was diluted with sufficient additional water to result in a primer coating composition composed of 8 percent polyolefin, based on the weight of total composition. This composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F.

Storage stability tests were conducted by visual inspection in glass jars. The results of these tests are as follows:

Stability at 75° F. for 8 weeks: Slight settling
Stability at 125° F. for 4 weeks: Slight settling Freeze/thaw stability tests were conducted in accordance with ASTM D2243 with visual inspection. Results of this test were no change after 5 cycles.

Paint adhesion tests were conducted in accordance with ASTM D 3359-83, Method A. Results of this test were as follows:

Paint adhesion on polypropylene: 90%
Paint adhesion on TPO: 100%

EXAMPLE 3

This example illustrates preparation of a composition of the invention using a different non-chlorinated, maleated polyolefin, than used in Example 1.

40 grams of an amorphous, non-chlorinated, maleated polypropylene butene-ethylene comprised of 69 mole percent propylene, 25 mole percent butene and 6 mole percent ethylene having an acid number of 39 and a molecular weight of at least 800, 8 grams of a C11–C15 secondary ethoxylated alcohol sold by Union Carbide under the name Tergitol 15-S-9, 4 grams ammonium hydroxide and 45 grams of water were charged to a vessel. After cooking the emulsion for 30 minutes, 67 grams of a dilution water at a temperature of at least 85° C. was pumped into the pressure vessel resulting in a composition having a solids level of approximately 32 percent. The resultant composition was diluted with sufficient additional water to result in a primer coating composition composed of 8 percent polyolefin, based on the weight of total composition. This composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F.

Storage stability tests were conducted by visual inspection in glass jars. The results of these tests are as follows:

Stability at 75° F. for 8 weeks: Slight settling
Stability at 125° F. for 4 weeks: Slight settling Freeze/thaw stability tests were conducted in accordance with ASTM D2243 with visual inspection. Results of this test were no change after 5 cycles.

Paint adhesion tests were conducted in accordance with ASTM D 3359-83, Method A. Results of this test were as follows:

Paint adhesion on polypropylene: 100%
Paint adhesion on TPO: 100%

EXAMPLE 4

This example illustrates preparation of a composition of the invention using a different non-chlorinated, maleated polyolefin, than used in Example 1.

40 grams of an amorphous, non-chlorinated, maleated polypropylene-butene comprised of 55 mole percent propylene and 45 mole percent butene having an acid number of 40 and a molecular weight of at least 800, 8 grams of a C11–C15 secondary ethoxylated alcohol sold by Union Carbide under the name Tergitol 15-S-9, 4 grams ammonium hydroxide and 45 grams of water were charged to a vessel. After cooking the emulsion for 30 minutes, 67 grams of a dilution water at a temperature of at least 85° C. was pumped into the pressure vessel resulting in a composition having a solids level of approximately 32 percent. The resultant composition was diluted with sufficient additional water to result in a primer coating composition composed of 8 percent polyolefin, based on the weight of total composition. This composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F.

Storage stability tests were conducted by visual inspection in glass jars. The results of these tests are as follows:

Stability at 75° F. for 8 weeks: Slight settling
Stability at 125° F. for 4 weeks: Slight settling Freeze/thaw stability tests were conducted in accordance with ASTM D2243 with visual inspection. Results of this test were no change after 5 cycles.

Paint adhesion tests were conducted in accordance with ASTM D 3359-83, Method A. Results of this test were as follows:

Paint adhesion on polypropylene: 95%
Paint adhesion on TPO: 100%

EXAMPLE 5

This example illustrates preparation of a composition of the invention using a different non-chlorinated, maleated polyolefin and a different amine than used in Example 1.

40 grams of an amorphous, non-chlorinated, maleated polypropylene having a acid number of 42 and a molecular weight of at least 800, 6 grams of a C11–C15 secondary ethoxylated alcohol sold by Union Carbide under the name Tergitol 15-S-9, 8 grams of morpholine and 45 grams of water were charged to a vessel. After cooking the emulsion for 30 minutes, 67 grams of a dilution water at a temperature of at least 85° C. was pumped into the pressure vessel resulting in a composition having a solids level of approximately 32 percent. The resultant composition was diluted with sufficient additional water to result in a primer coating composition composed of 8 percent polyolefin, based on the weight of total composition. This composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F.

Storage stability tests were conducted by visual inspection in glass jars. The results of these tests are as follows:

Stability at 75° F. for 8 weeks: Slight settling
Stability at 125° F. for 4 weeks: Slight settling Freeze/thaw stability tests were conducted in accordance with ASTM D2243 with visual inspection. Results of this test were no change after 5 cycles.

Paint adhesion tests were conducted in accordance with ASTM D 3359-83, Method A. Results of this test were as follows:

Paint adhesion on polypropylene: 50%
Paint adhesion on TPO: 100%

EXAMPLE 6

This example illustrates preparation of a composition of the invention using the same polyolefin used in Example 1 but with a different amount of the same surfactant and a different amount of the same amine than used in Example 1.

40 grams of the amorphous, non-chlorinated, maleated propylene-hexene comprised of 87 mole percent propylene and 13 mole percent hexene having an acid number of 40 and a molecular weight of at least 800, 12 grams of a C11–C15 secondary ethoxylated alcohol sold by Union Carbide under the name Tergitol 15-S-9, 4 grams ammonium hydroxide and 45 grams of water were charged to a vessel. After cooking the emulsion for 30 minutes, 67 grams of a dilution water at a temperature of at least 85° C. was pumped into the pressure vessel resulting in a composition having a solids level of approximately 32 percent. The resultant composition was diluted with sufficient additional water to result in a primer coating composition composed of 8 percent polyolefin, based on the weight of total composition. This composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F.

Storage stability tests were conducted by visual inspection in glass jars. The results of these tests are as follows:

Stability at 75° F. for 8 weeks: Slight settling

Paint adhesion tests were conducted in accordance with ASTM D 3359-83, Method A. Results of this test were as follows:

Paint adhesion on polypropylene: 25%
Paint adhesion on TPO: 100%

EXAMPLE 7

This example illustrates preparation of a composition of the invention using a different polyolefin, a different amount of the same surfactant and a different amount of the same amine than used in Example 1.

40 grams of the amorphous, non-chlorinated, maleated polypropylene-hexene comprised of 66 mole percent propylene and 34 mole percent hexene having an acid number of 40 and a molecular weight of at least 800, 12 grams of a C11–C15 secondary ethoxylated alcohol sold by Union Carbide under the name Tergitol 15-S-9, 4 grams ammonium hydroxide and 45 grams of water were charged to a vessel. After cooking the emulsion for 30 minutes, 67 grams of a dilution water at a temperature of at least 85° C. was pumped into the pressure vessel resulting in a composition having a solids level of approximately 32 percent. The resultant composition was diluted with sufficient additional water to result in a primer coating composition composed of 8 percent polyolefin, based on the weight of total composition. This composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F.

Storage stability tests were conducted by visual inspection in glass jars. The results of these tests are as follows:

Stability at 75° F. for 8 weeks: Slight settling

Paint adhesion tests were conducted in accordance with ASTM D 3359-83, Method A. Results of this test were as follows:

Paint adhesion on polypropylene: 100%
Paint adhesion on TPO: 100%

EXAMPLE 8

This example illustrates preparation of a composition of the invention using a different polyolefin, a different amount of the same surfactant and a different amount of the same amine than used in Example 1.

40 grams of an amorphous, non-chlorinated, maleated propylene-hexene comprised of 38 mole percent propylene and 62 mole percent hexene having an acid number of 53 and a molecular weight of at least 800, 12 grams of a C11–C15 secondary ethoxylated alcohol sold by Union Carbide under the name Tergitol 15-S-9, 4 grams ammonium hydroxide and 45 grams of water were charged to a vessel. After cooking the emulsion for 30 minutes, 67 grams of a dilution water at a temperature of at least 85° C. was pumped into the pressure vessel resulting in a composition having a solids level of approximately 32 percent. The resultant composition was diluted with sufficient additional water to result in a primer coating composition composed of 8 percent polyolefin, based on the weight of total composition. This composition was also applied to a polyolefin which has been modified with an elastomeric polymer. These materials are generally designated in the trade as "thermoplastic olefins" and are abbreviated "TPO". The composition was applied by spraying and then dried by baking for 10 minutes at 160° F.

Storage stability tests were conducted by visual inspection in glass jars. The results of these tests are as follows:

Stability at 75° F. for 8 weeks: Slight settling Freeze/thaw stability tests were conducted in accordance with ASTM D2243 with visual inspection. Results of this test were no change after 5 cycles.

Paint adhesion tests were conducted in accordance with ASTM D 3359-83, Method A. Results of this test were as follows:

Paint adhesion on polypropylene: 5%
Paint adhesion on TPO: 100%

We claim:
1. A composition comprising
 (A) a polymer selected from the group consisting of
  (1) an amorphous, non-chlorinated, maleated polypropylene having an acid number in the range of 15 to 65 and a molecular weight of at least 800,
  (2) an amorphous, non-chlorinated, maleated propylene-ethylene copolymer having propylene units in the range of 60 to 98 mole percent, ethylene units in the range of 40 to 2 mole percent, an acid number in the range of 15 to 65 and a molecular weight of at least 800,
  (3) an amorphous, non-chlorinated, maleated propylene-hexene copolymer having propylene units in the range of 30 to 98 mole percent, hexene units in the range of 70 to 2 mole percent, an acid number in the range of 20 to 65 and a molecular weight of at least 800,
  (4) an amorphous, non-chlorinated, maleated propylene-butene copolymer having propylene units in the range of 40 to 98 mole percent, butene units in the range of 60 to 2 mole percent, an acid number in the range of 15 to 50 and a molecular weight of at least 800,
  (5) an amorphous, non-chlorinated, maleated propylene-ethylene-butene terpolymer having propylene units in the range of 40 to 80 mole percent, ethylene units in the range of 1 to 20 mole percent, butene units in the range of 30 to 60 mole percent, an acid number in the range of 15 to 50 and a molecular weight of at least 800, and
  (6) an amorphous, non-chlorinated, maleated propylene-ethylene-hexene terpolymer having propylene units in the range of 40 to 80 mole percent, ethylene units in the range of 1 to 20 mole percent, hexene units in the range of 20 to 60 mole percent, an acid number in the range of 15 to 50 and a molecular weight of at least 800,
(B) from 18 to 50 weight percent, based on the weight of component (A), of a nonionic surfactant,
(c) from 4 to 30 weight percent, based on the weight of component (A), of a primary, secondary or tertiary amine, and
(D) water.

2. The composition of claim 1 wherein the polymer is selected from the group consisting of
  (1) an amorphous, non-chlorinated, maleated polypropylene having an acid number in the range of 30 to 50 and a molecular weight of at least 800,
  (2) an amorphous, non-chlorinated, maleated propylene-ethylene copolymer having propylene units in the range of 80 to 95 mole percent, ethylene units in the range of 20 to 5 mole percent, an acid number in the range of 30 to 50 and a molecular weight of at least 800,
  (3) an amorphous, non-chlorinated, maleated propylene-hexene copolymer having propylene units in the range of 35 to 95 mole percent, hexene units in the range of 65 to 5 mole percent, an acid number in the range of 25 to 65 and a molecular weight of at least 800,
  (4) an amorphous, non-chlorinated, maleated propylene-butene copolymer having propylene units in the range of 45 to 90 mole percent, butene units in the range of 55 to 10 mole percent, an acid number in the range of 20 to 45 and a molecular weight of at least 800,
  (5) an amorphous, non-chlorinated, maleated propylene-ethylene-butene terpolymer having propylene units in the range of 50 to 80 mole percent, ethylene units in the range of 1 to 20 mole percent, butene units in the range of 15 to 49 mole percent, an acid number in the range of 20 to 45 and a molecular weight of at least 800, and
  (6) an amorphous, non-chlorinated, maleated propylene-ethylene-hexene terpolymer having propylene units in the range of 40 to 80 mole percent, ethylene units in the range of 1 to 20 mole percent, hexene units in the range of 20 to 60 mole percent, an acid number in the range of 15 to 50 and a molecular weight of at least 800.

3. The composition of claim 1 wherein component (B) is selected from the group consisting of primary ethoxylated alcohols and secondary ethoxylated alcohols.

4. The composition of claim 3 wherein component (B) is selected from the group consisting of primary ethoxylated alcohols having 12 to 15 carbon atoms and secondary ethoxylated alcohols having 11 to 15 carbon atoms.

5. The composition of claim 1 wherein component (C) is selected from the group consisting of morpholine, 2-amino-2-methyl-1-propanol, triethylamine and ammonium hydroxide.

6. The composition of claim 1 wherein component (B) is in the range of 20 to 25 weight percent.

7. The composition of claim 1 wherein component (C) is in the range of 8 to 10 weight percent.

* * * * *